United States Patent Office 3,223,740
Patented Dec. 14, 1965

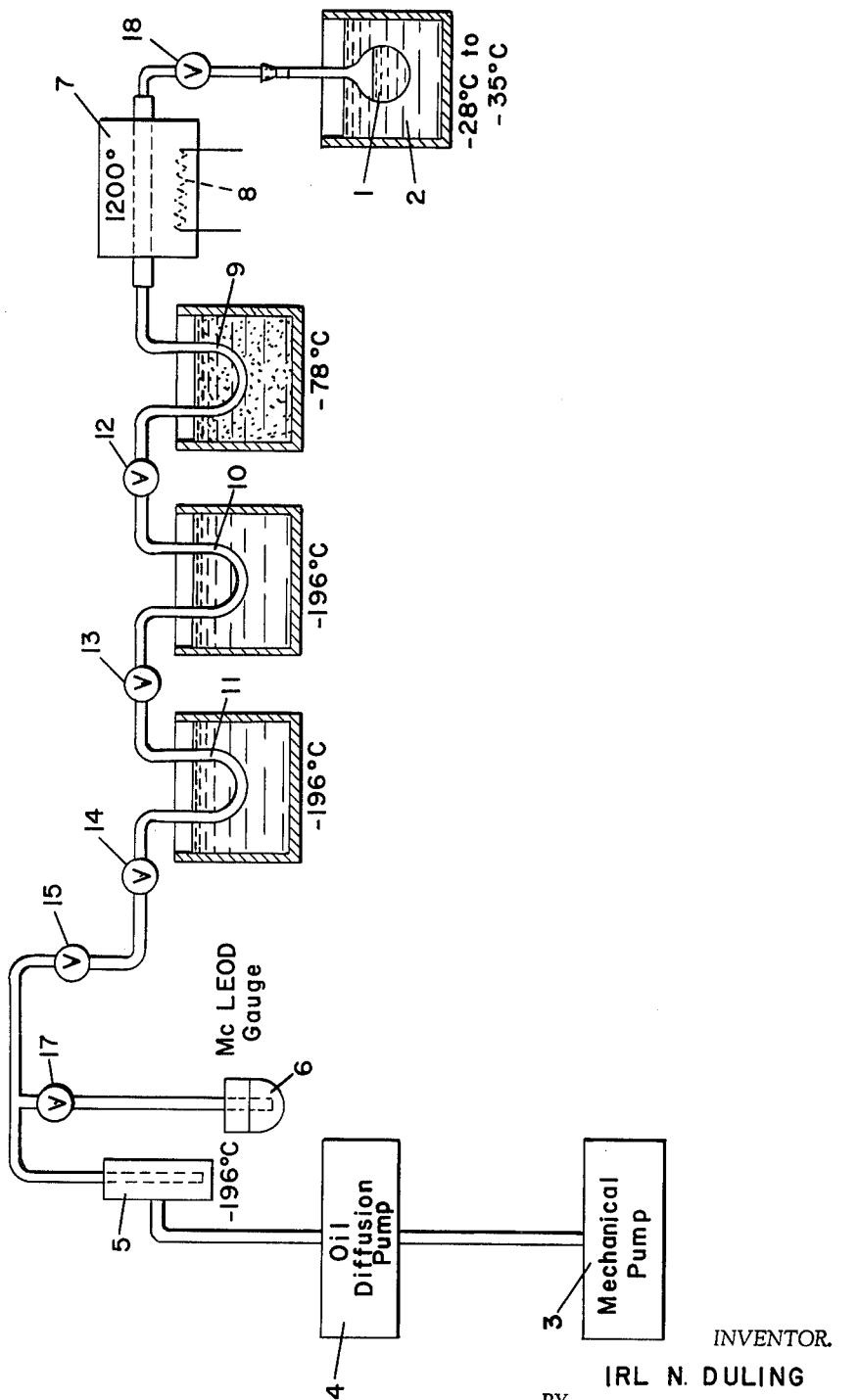

3,223,740
PROCESS FOR PREPARING DIHALO-
ACETYLENES
Irl N. Duling, West Chester, Pa., assignor to Sun Oil
Company, Philadelphia, Pa., a corporation of New
Jersey
Filed Apr. 10, 1962, Ser. No. 186,478
2 Claims. (Cl. 260—654)

This invention relates to a process for the preparation of dihaloacetylenes.

Dihaloacetylenes are of interest for use as components in high energy fuels for use in jet and ramjet engines. They have been prepared in the past by passing acetylene through alkali hypohalites at low temperature.

The object of this invention is to provide a pyrolytic process for the perparation of dihaloacetylenes.

According to the invention a halohydrocarbon is pyrolyzed under vacuum and the products are immediately quenched. The desired dihaloacetylene is then recovered from the undesired pyrolysis products by sublimation.

Suitable feed materials are halohydrocarbons containing from 1 to 2 carbon atoms and from 2 to 6 halogen atoms. Specific examples include carbon tetrachloride, carbon tetrabromide, carbon tetrafluoride, tetrachloroethylene, tetrabromoethylene, tetrafluoroethylene, tetraiodoethylene, hexachloroethane, hexabromoethane, hexafluoroethane and materials which yield the former halohydrocarbons upon pyrolysis. The quantity of feed material treated is limited only by the type of processing equipment employed. It may be supplied in liquid or gaseous form.

The pyrolysis is carried out at a temperature ranging from about 1100 to about 1300° C. On occasion, higher or lower temperatures can be used. A temperature of 1200–1300° C. seems to give the best results and is preferred.

The process is conducted under vacuum in order to prevent substantial reaction with the other pyrolysis products before quenching. Pressures in the range of from about .001 micron to 1.0 millimeter are suitable and pressures of .001 to 12 microns are preferred. Occasionally higher or lower pressures can be used.

The pyrolysis products are immediately quenched to a temperature in the range of from −60 to −80°. This prevents further reaction of the dihaloacetylene and serves to separate liquid products. The quenching may be accomplished by one or more cold traps or by any other suitable cold separation means. The dihaloacetylene is in vapor form and it is solidified in one or more cold traps or other suitable cooling means maintained at a temperature in the range of from −100 to −200° C. The dihaloacetylene is purified by raising the temperature to a range of from about −60 to about −80°. The impurities are thus separated by sublimation.

The following example is a specific illustration of the invention.

*Example*

In describing the process, reference is made to the drawing which discloses one embodiment. A glass bulb, 1 containing about 20 ml. of $CCl_4$ was placed in a Dry Ice bath 2 at −28 to −35° C. A vacuum was maintained at about 5 microns by means of a mechanical pump 3, an oil diffusion pump 4 and protective trap 5 and a McLeod gage 6. The flow rate of the $CCl_4$ was controlled by the bath temperature and the amount of vacuum maintained. The sublimed $CCl_4$ passed through an unpacked 23″ quartz tube 7 having an inside diameter of 1″. Tube temperature was 1100–1200° C. All lines were 1″ diameter glass tubing. The tube was heated by electrical heating element 8. Pyrolysis products were immediately quenched in a first cold trap 9, cooled with a mixture of Dry Ice and acetone. The temperature of this trap was maintained at about −78° C. Hexachloroethane, tetrachloroethylene and hexachlorobenzene were condensed in the first trap. Chlorine and dichloroacetylene were condensed in traps 10 and 11. These traps were cooled with liquid nitrogen to a temperature of about −196° C. After 2 hours the flow of $CCl_4$ was stopped. The first nitrogen cooled trap contained a yellow solid. Valve 12 was closed and the liquid nitrogen bath replaced by a Dry Ice-acetone bath. The solid was warmed and the chlorine sublimed off. About 3 ml. of a white solid remained. Valves 12–18 can be open or closed as desired.

Analysis of a gas sample of the product by infrared gave a band at 10.05 microns.

The product was further identified by its reaction with chlorine to produce hexachloroethane and its reaction with oxygen to yield phosgene. It is explosive and must be handled with care. Dichloroacetylene has been used in high energy fuel compositions.

Tetrachloroethylene and hexchloroethane were also pyrolyzed in the same apparatus and dichloroacetylene was produced.

Dibromoacetylene, diiodoacetylene and difluoroacetylene can be produced from the corresponding halohydrocarbon precursors according to the process of the invention.

The invention is not limited to the preferred embodiments. For example the process is susceptible to continuous operation and various streams can be recycled.

The invention claimed is:
1. A process for the production of dichloroacetylene which comprises pyrolyzing a chlorohydrocarbon selected from the group consisting of carbon tetrachloride, tetrachloroethylene, and hexachloroethane at a temperature in the range of from about 1200° C. to about 1300° C. and a pressure in the range of from about .001 micron to about 12 microns, quenching the reaction products to a temperature in the range of from −60° to −80° C. and separating dichloroacetylene from the reaction products.

2. A process for the production of dichloroacetylene consisting essentially of the steps of pyrolyzing carbon tetrachloride at a temperature in the range of from about 1200° C. to about 1300° C. and a pressure of from .001–12 microns, quenching the pyrolysis products to a temperature in the range of from −60 to −80° C. in a first separation stage to condense hexachloroethane, tetrachloroethylene and hexachlorobenzene, quenching chlorine and dichloroacetylene at a temperature in the range of from −150° C. to −200° C. and separating chlorine from the desired dichloroacetylene product by warming the mixture to a temperature in the range of from −60° C. to −80° C.

References Cited by the Examiner
FOREIGN PATENTS
166,909  10/1950  Austria.

OTHER REFERENCES
Blanchard et al.: Can. J. Chem., 35, 94–97 (1957).
Doty: J. Chem. Physics, 12, 399–402 (1944).

LEON ZITVER, *Primary Examiner.*